United States Patent
Beck et al.

(10) Patent No.: US 8,197,944 B2
(45) Date of Patent: Jun. 12, 2012

(54) ONE-COMPONENT STRUCTURAL ADHESIVE HAVING HIGH INITIAL ADHESION

(75) Inventors: Horst Beck, Neuss-Rosellen (DE); Thomas Bachon, Duesseldorf (DE); Nadja Hermsdorf, Mettmann (DE); Sebastian Kostyra, Monheim (DE); Martin Majolo, Erkelenz (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/555,065

(22) Filed: Sep. 8, 2009

(65) Prior Publication Data

US 2009/0324965 A1     Dec. 31, 2009

Related U.S. Application Data

(63) Continuation of application No. PCT/EP2008/050209, filed on Jan. 10, 2008.

(30) Foreign Application Priority Data

Mar. 9, 2007   (DE) .................. 10 2007 011 511

(51) Int. Cl.
*B32B 17/00* (2006.01)
*C08L 83/00* (2006.01)

(52) U.S. Cl. ........ 428/448; 428/446; 428/457; 524/556; 524/543; 524/588; 524/599; 524/606

(58) Field of Classification Search .................. 428/446, 428/448, 426, 457, 423.1; 524/543, 556, 524/588, 599, 606
See application file for complete search history.

(56) References Cited

U.S. PATENT DOCUMENTS

| | | | |
|---|---|---|---|
| 3,971,751 A | 7/1976 | Isayama et al. | |
| 5,342,867 A * | 8/1994 | Ryan et al. ................ | 524/101 |
| 6,756,465 B1 | 6/2004 | Jacobine et al. | |
| 6,770,706 B2 | 8/2004 | Lewin et al. | |
| 6,884,852 B1 | 4/2005 | Klauck et al. | |
| 7,009,022 B2 | 3/2006 | Duch et al. | |
| 7,057,001 B2 | 6/2006 | Bachon et al. | |
| 7,199,207 B2 | 4/2007 | Gruenewaelder et al. | |
| 7,259,207 B2 | 8/2007 | Gruenewaelder et al. | |
| 7,589,134 B2 | 9/2009 | Pfenninger et al. | |
| 2003/0130413 A1 * | 7/2003 | Gruenewaelder et al. .... | 524/589 |
| 2004/0176522 A1 * | 9/2004 | Schaetzle et al. ............. | 524/495 |
| 2006/0178470 A1 | 8/2006 | Majolo et al. | |
| 2006/0183845 A1 * | 8/2006 | Harada et al. ................. | 524/588 |
| 2006/0194930 A1 | 8/2006 | Bachon et al. | |
| 2008/0245476 A1 | 10/2008 | Loth et al. | |

FOREIGN PATENT DOCUMENTS

| | | |
|---|---|---|
| DE | 101 16 023 | 10/2001 |
| DE | 101 23 620 | 11/2001 |
| DE | 101 52 505 | 7/2002 |
| DE | 103 50 481 | 6/2005 |
| DE | 1005054008 | 5/2007 |
| EP | 1 093 482 | 3/1999 |
| EP | 1 256 595 | 5/2001 |
| EP | 1 531 172 | 11/2004 |
| EP | 1 548 080 | 12/2004 |
| GB | 1 217 919 | 1/1971 |
| GB | 2 061 990 | 5/1981 |
| WO | WO 99/48942 | 9/1999 |
| WO | WO 01/74961 | 10/2001 |
| WO | WO 03/066700 | 8/2003 |
| WO | WO 2005/033241 | 4/2005 |
| WO | WO 2005/047394 | 5/2005 |

OTHER PUBLICATIONS

DIN EN 205.

* cited by examiner

*Primary Examiner* — Thao T. Tran

(57) ABSTRACT

The invention relates to a one-component structural adhesive having a flow limit of at least 1500 Pa and an initial adhesion of more than 30 g/cm$^2$, which contains at least one thickening agent and/or at least one filler. The invention further relates to the manufacture of such one-component structural adhesives and to the use of one or more thickening agents and/or one or more fillers for the manufacture of solid to kneadable one-component structural adhesive compounds having high initial adhesion.

15 Claims, No Drawings

ONE-COMPONENT STRUCTURAL ADHESIVE HAVING HIGH INITIAL ADHESION

This application is a continuation of International Application PCT/EP2008/050209, filed on Jan. 10, 2008, which claims benefit of German Application No. DE 10 2007 011 511.5, filed on Mar. 9, 2007, the contents of each of which is incorporated herein by reference in its entirety.

The invention relates to one-component structural adhesives having high initial adhesion, to a method for the manufacture and use thereof, and to the use of fillers and thickening agents for the manufacture thereof.

A preferred application of structural adhesives is the rapid and permanent mounting of objects onto ceilings, walls, and floors. Particularly desirable in this context is rapid and easy installation of heavy objects with no need for additional securing after application of the adhesive compound. The adhesive compounds should also be capable of bridging material irregularities or gaps between the parts to be adhesively bonded.

A "structural adhesive" is understood as a composition that, because of its very high initial adhesion along with good load-bearing capacity for the adhesive bonding of wood, metal, ceramic, PVC, and further plastics both indoors and outdoors, but also its particular capabilities in terms of gap bridging, adhesion spectrum, and flexibility, is suitable for installation purposes principally in the construction industry.

The structural adhesives hitherto known on the market have a maximum initial adhesion of 30 g/cm$^2$. This makes possible the installation of objects without additional securing of the object, but problems occur when the objects are particularly heavy. Further installation problems exist with the installation of objects that are under stress (e.g. curved baseboards). These objects must be additionally secured until the adhesive compound has cured. Such installation applications always entail time-consuming, and sometimes also complex, additional effort.

A distinction is made among four types of structural adhesives: a) solvent-containing systems, b) reactive systems, c) hot melt adhesives, and d) water-based systems.

The advantages of solvent-containing structural adhesives are that the solvent which is present can quickly escape from the adhesive compound, so that high adhesion for structural purposes can be achieved relatively quickly.

Reactive systems and hot melt adhesives either require special conditions or equipment, or need a relatively long time to develop sufficient adhesion properties for installation purposes.

Conventional water-based systems have the disadvantage that their contained water is only slowly given off. The curing process for the adhesive compound is therefore relatively slow. The advantage of water-based systems, however, is that no unpleasant odor emissions and/or health hazards occur as a result of released solvents. No structural adhesive having high initial adhesion values of more than 30 g/cm$^2$, in particular more than 40 g/cm$^2$, so far exists, however.

GB 2 061 990 describes a homogeneously spreadable adhesive for securing ceramic tiles. It contains 2 to 50 wt % of an aqueous dispersion or solution of an organic polymer having a solids concentration from 30 to 70%, 40 to 80 wt % of an inorganic filler, 0.5 to 15 wt % of an organic additive, and 0 to 10 wt % of auxiliaries. In addition to cellulose ethers, polyacrylates are also recited as organic thickening agents. This adhesive is intended to be used to secure ceramic tiles to the floor. A disadvantage of this known adhesive is that its initial adhesion is still too low to secure heavy objects, such as bricks, to walls immediately after leveling of the adhesive.

The structural adhesive based on an aqueous dispersion and described in International Application WO 01/74961 comes closer to achieving this goal. Here an inorganic thickening agent is used to obtain a spreadable formulation that can be applied from a cartridge and possesses initial adhesion values of up to 30 g/cm$^2$.

The object of the present invention was to make available structural adhesives that exhibit greater initial adhesion as compared with the known structural adhesives, are shelf-stable, and can be used universally in gap-bridging fashion both indoors and outdoors on a very wide variety of substrates.

The structural adhesive according to the present invention was therefore intended to render superfluous any securing of parts to be bonded to one another before they cure, and to exhibit initial adhesion similar to that of a contact adhesive. In contrast to a contact adhesive, however, the structural adhesive was intended to achieve a greater final strength by curing.

It has been found, surprisingly, that the above objects can be achieved by making available a one-component structural adhesive that has a flow limit of at least 1500 Pa and an initial adhesion of more than 30 g/cm$^2$, and that contains at least one thickening agent and/or at least one filler.

The adhesives according to the present invention differ from the adhesives known from GB 2 061 990 and WO 01/74961 because of their much higher initial adhesion of more than 30 g/cm$^2$, by preference more than 40 g/cm$^2$, particularly preferably more than 50, 100, 150, or even more than 200 or more than 300 g/cm$^2$.

Adhesives of this kind according to the present invention can be obtained by adding thickening agents and fillers to conventional structural adhesives. This preferably yields dimensionally stable compounds that possess a high flow limit of at least 1500 Pa, by preference at least 1800 Pa, particularly preferably at least 2000, 2500, or even 3000 Pa.

The structural adhesives according to the present invention are preferably aqueous, solvent-containing, or mixed aqueous/solvent-containing compositions.

Particularly preferably, the structural adhesives according to the present invention are reactive systems.

In contrast to the formulations described in GB 2 061 990 and WO 01/74961, the structural adhesives according to the present invention are usually not spreadable. They therefore usually cannot be extruded from cartridges, and do not possess a creamy consistency that allows easy leveling.

The structural adhesives according to the present invention are instead preferably notable for a dimensional stability such that the shear forces usual in the context of extrusion from a cartridge would not be sufficient to force them manually out of that cartridge. The structural adhesives according to the present invention therefore possess an extrusion rate of by preference $\leq$100 g/min, better $\leq$70 g/min or $\leq$50 g/min, particularly preferably $\leq$40 g/min, and very particularly preferably $\leq$30 g/min according to ISO 9048 (pressure: 2 bar; temperature: 23° C.; relative humidity: 50%; extrusion apparatus having an inside diameter of 5.0 cm, a length of 18 cm, and a nozzle diameter of 4 mm).

The structural adhesives according to the present invention are preferably kneadable, and can thus be used in gap-bridging fashion. They preferably cure in substantially bubble-free fashion.

"Bubble-free" is understood to mean that the material exhibits no visible foaming.

The term "kneadable" is understood to mean that the structural adhesives are deformable by finger pressure, i.e. by the action of a force of at most 100 N, by preference at most 50 N, particularly preferably at most 30 N, onto a cube-shaped substance element of the one-component structural adhesive 1 cm on a side. The cube-shaped substance element of the one-component structural adhesive can be referred to as "dimensionally stable," i.e. it retains its cubical shape without the action of an external force. The term "kneadable" therefore does not embrace, for example, pasty, deliquescent materials.

The structural adhesive according to the present invention can be presented in any fashion, for example in the form of strands, rods, strips, sheets, films, and the like.

A preferred presentation of the structural adhesive according to the present invention is, for example, adhesive pads made up of the structural adhesive. These can be manufactured in any thickness, for example 0.1 to 10 mm, by preference 1 to 10 mm, particularly preferably 2 to 5, and in any shape, for example strips, discs, and the like. They can be packaged by preference in so-called monodose packages, such as those known e.g. from the pharmaceutical sector as see-through packages. Those structural adhesives according to the present invention that cure by moisture can, in particular, be packaged in this fashion.

Presentation in monodose packages has the advantage that the adhesive pads are individually removable and, because of their dimensional stability, are obtainable preshaped in any fashion for specific uses.

The structural adhesives according to the present invention can also be presented in the form of sheets of any size and thickness, optionally applied onto a carrier in rolled form, and can be stamped or cut to size upon use. It is thus also possible to lay onto the adhesive layer the material to be adhesively bonded, use a knife to follow the contours of the material to be bonded, remove the carrier, and mount the material to be bonded, equipped with the adhesive layer, onto ceilings, walls, and the like.

One-component adhesives are especially suitable as binder constituents of the structural adhesive. "One-component adhesives" are to be understood, in particular, as those adhesives that cure by means of a change in environmental conditions. This can occur, for example, as a result of temperature elevation, entry of atmospheric humidity, exclusion of atmospheric oxygen, or contact with the substrate surface. The hardener component deriving from the environment, for example the water in atmospheric humidity, thus does not result in categorization as a two-component adhesive. One-component adhesives can therefore also contain multiple components already mixed with one another, which are stable under storage conditions and cure only upon application as a result of a change in environmental conditions. This can include, for example, reactive resin components or binder components such as, for example, polyols (e.g. Acclaim 2200N of the Bayer company, Leverkusen). One-component adhesives are generally usable by the consumer without the admixture of additional components such as, for example, hardeners. The one-component adhesives therefore also include, for example, compositions that contain silyl-terminated polymers and polyol or are made up of polyurethane prepolymers, since it is only the entry of atmospheric humidity that causes them to cure.

Examples of polyurethane prepolymers in one-component adhesives are known, for example from WO 03/066700; polymers that moisture-crosslink via silyl groups are known, for example, from U.S. Pat. No. 3,971,751, EP 1093482 A1, U.S. Pat. No. 7,009,022 B2, U.S. Pat. No. 6,756,465 B1, DE 10152505 A1, and DE 10350481 A1

Silyl-terminated polymers that are usable for use in the structural adhesives according to the present invention are, in particular, those of the general formula (I):

$$R\text{-}[A\text{-}R^3\text{—}SiR^1_x(OR^2)_{3-x}]_n \qquad (I),$$

in which R is an organic basic structure, A is an oxygen atom, an alkylene group such as, for example, a methylene group or a carboxy, carbamate, carbonate, ureido, urethane, or sulfonate group, $R^1$ is an alkyl residue having 1 to 4 carbon atoms, $R^2$ is an alkyl residue having 1 to 4 carbon atoms or an acyl residue having 1 to 4 carbon atoms, $R^3$ is a straight-chain or branched, substituted or unsubstituted alkylene residue having 1 to 8 carbon atoms, x=0 to 2, and n=1 to 10,000, wherein the silyl residues are identical or different, and in the case of multiple $R^1$ and/or $R^2$ residues, the latter are respectively identical or different.

The silyl-terminated polymers described in WO 2005/047394 A1 and EP 1093482 B1 are preferred.

The binder content of the structural adhesives according to the present invention is by preference 10 to 75 wt %, better 30 to 75 wt %, preferably 40 to 75 wt %, and particular preferably 45 to 70 wt % and particularly preferably 50 to 70 wt %, based on the total weight of the structural adhesive composition.

The thickening agents used in the structural adhesive according to the present invention are by preference high-molecular-weight, usually organic substances that absorb liquids such as, for example, water and/or organic solvents, and thereby swell up or form intermolecular lattice structures. Fillers that absorb liquids and thereby swell up or form intermolecular lattice structures, i.e. act as a thickening agent or thickener, are regarded as thickening agents in the context of the present invention.

Thickening agents to be mentioned are, in particular, organic natural compounds such as, for example, agar-agar, carrageenan, tragacanth, gum arabic, alginates, pectins, polyoses, guar flour, locust bean flour, starch, dextrins, gelatins, and casein; modified organic natural substances such as, for example, carboxymethyl celluloses and other cellulose ethers, hydroxyethyl cellulose, hydroxypropyl cellulose, and the like, as well as seed flour ethers, hardened castor oil, stearic acid; entirely synthetic organic compounds such as polyacrylates and polymethacrylates, vinyl polymers, polycarboxylic acids, polyethers, polyimines, and polyamides; and inorganic compounds such as, for example, polysilicic acids, clay minerals such as montmorillonites, zeolites, and silicic acids.

Examples of organic thickening agents are also, among others, (aqueous solutions of) copolymers based on acrylic acid and/or acrylamide, for example emulsified in an oil fraction, in particular a mineral oil fraction. Concrete examples of a w/o emulsion are Collacral HP of the BASF company, as well as Texipol grades of the Scott-Bader company. Further commercially obtainable thickening agents are, for example, Disparlon® grades, for example Disparlon® 6500. Other organic thickening agents are, for example, the water-soluble polyurethane thickener Nopco DSX 3290 of the Cognis company, associative thickeners such as, for example, Indunal T 112 of the Indulor Chemie company, which is an aqueous solution of the terpolymer of acrylates and methacrylates and of carboxyl-group-containing comonomers (this being an anionic associative thickener), alkali-swellable thickeners such as, for example, the acrylate polymer dispersion Acrysol TT 615 of the Rohm & Haas company (which is an alkali-swellable anionic dispersion having a solids content of approx. 30 wt %), and polymer dispersions based on acrylic acid and acrylamide.

Nonreactive thickeners such as amide waxes, for example Crayvallac SLX of the Cray Valley company, are particularly suitable as organic thickening agents.

Examples of inorganic thickening agents are preferably highly dispersed, in particular pyrogenic silicic acids, in either hydrophilic or hydrophobic form. The preferred hydrophilic silicic acid is water-wettable and occurs upon flame hydrolysis Hydrophobic silicic acid is obtained therefrom, for example by reaction with organosilanes. The surface area is by preference in the range from 125 to 400 m$^2$/g, measured with the BET method according to DIN 66131. Highly dispersed silicic acid can be used both as a powder and as an aqueous dispersion. Examples are HDK of the Wacker company, and Aerosil of the Degussa-Huls company.

The preferred concentration of thickening agents, based on the total weight of the structural adhesive, is 5 to 50 wt %, particularly preferably 5 to 40, and very particularly preferably 8 to 40 wt % or 10 to 35 wt %.

In addition to their purpose according to the present invention, namely influencing rheology, fillers serve other purposes including reducing shrinkage. Both organic and inorganic fillers can be used, the inorganic fillers being preferred. Included among the inorganic fillers are, in particular, silicates such as, for example, natural lamellar magnesium silicate hydrates, natural aluminum silicate hydrates, and natural potassium aluminum hydrates; carbonates such as, for example, natural calcium carbonates in crystalline form or from shell residues, precipitated calcium carbonates, and natural calcium magnesium carbonates; sulfates such as, for example, natural or synthetic barium salts; synthetic or natural silicic acids, which optionally can also act as thickening agents; and a plurality of further substances such as, for example, graphite or micaceous hematite.

Concrete examples of fillers are, for example, the Omyacarb chalk grades of the Omya company, or filler particles made of andalusite, sillimanite, kyanite, mullite, pyrophyllite, imogolite, or allophane. Compounds based on sodium aluminates or calcium silicates are also suitable. Also suitable are minerals such as siliceous earth, calcium sulfate (gypsum) that does not derive from flue gas desulfuration units, in the form of the anhydrite, hemihydrate, or dihydrate, quartz flour, silica gel, barium sulfate, titanium dioxide, zeolites, leucite, potassium feldspar, biotite, the group of the soro-, cyclo-, ino-, phyllo-, and tectosilicates, the group of the poorly soluble sulfates such as gypsum, anhydrite, or barium sulfate, as well as calcium minerals such as calcite or chalk ($CaCO_3$). The aforesaid inorganic materials can be used individually. It is just as possible, however, to use a mixture of two or more of the aforesaid compounds.

The preferred concentration of fillers, based on the total weight of the structural adhesive, is 0 to 50 wt %, particularly preferably 5 to 40, and very particularly preferably 10 to 35 wt %.

With the at least one thickening agent and/or at least one filler, the flow limit of the structural adhesive is adjusted at least to a value of at least 1500 Pa. As indicated above, however, this value is preferably higher, and can be equal, for example, to at least 1800 Pa, particularly preferably at least 2000, 2500, 3000, 4000, 6000, 8000, or more than 10,000 Pa such as, for example, 12,000 Pa.

By preference, the structural adhesive is thickened with the thickening agent until its consistency is dimensionally stable and the structural adhesive compound is kneadable. An addition of thickening agent and/or filler proceeding beyond this may be advisable for economic reasons, since thickening agents and fillers are usually more inexpensive than the binder contained in the structural adhesive. An upper limit is reached only as a result of the wettability of the substrates to be adhesively bonded. If the concentrations of thickening agent and/or filler are too high, the wettability of the substrates to be bonded becomes reduced, and the adhesive bonding result is insufficient. The upper limit can easily be ascertained for each substrate with a few experiments.

Suitable substrates are, for example, plastic, wood, metal, textiles made of woven or nonwoven fibers, plaster, concrete, cementitious or gypsum-based leveling compounds, or ceramic.

It is generally advisable for the sum of the thickening-agent and filler components, based on the total weight of the structural adhesive, not to exceed 60 wt %, by preference 50 wt %, and particularly preferably 45 or 40 wt %, and by preference to equal at least 20 wt %, better at least 25 wt %, and best at least 30 wt %.

As further additives, the structural adhesives according to the present invention can contain, for example, curing catalysts such as dibutyl tin dilaurate (DBTL), adhesion promoters such as silane adhesion promoters, dyes, pigments, and plasticizers. Pigments that absorb liquids and thereby swell up or form intermolecular lattice structures, i.e. act at thickening agents or thickeners, are regarded as thickening agents in the context of the present invention.

A further subject of the present invention is a method for manufacturing the structural adhesives according to the present invention. The individual components of the structural adhesive according to the present invention can, in principle, be mixed with one another in any sequence. In order to obtain an adhesive compound that is as homogeneous as possible, it may be preferred to mix one or more constituents with one another in dissolved, predispersed, pre-emulsified, or melted form, optionally at an elevated temperature of, by preference, at least 50° C., particularly preferably at least 80° C. When kneadable compounds are obtained, especially with high concentrations of thickening agents and/or fillers, it is recommended to use a kneader for mixing.

A further subject of the invention is the use of the structural adhesives according to the present invention for the adhesive bonding of various materials or substrates, for example tiles, wood, metals, plastics, ceramic, glass, painted surfaces, and the like.

In the context of adhesive bonding of two pieces of wood per DIN EN 205 (Appendix A, 2.5×2 cm adhesive bonding area), final strengths (tensile shear strengths) of preferably at least 1.5 N/mm$^2$, particularly preferably at least 2.0 N/mm$^2$, and very particularly preferably at least 3.0 N/mm$^2$ are achieved with the structural adhesives according to the present invention.

In the context of the present invention, the initial adhesion, flow limit, and tensile shear strength are determined using the methods described below:

Method for Determining Initial Adhesion

A marking is applied onto one side of a test article 3×15 cm in length, made of untreated wood (birch plywood), with an 8-mm hole. The marking line is 10 cm away from the 3-cm long side that is not penetrated by a hole. An adhesive film approx 2 cm wide and 2 mm thick is applied onto the 10×3 cm marked area. Small balls 2 mm in diameter are then pressed into the center of the adhesive strip in order to ensure an exact thickness for the adhesive film. The balls are spaced approx. 2 cm apart from one another; the balls are located on an imaginary straight line at the center of the applied adhesive strip.

After introduction of the balls into the adhesive layer, an aluminum bar (anodized aluminum) 15×1.5 cm in size is pressed onto the balls. The aluminum bar used has on one side an orifice 8 mm in diameter. The bar is placed onto the adhesive layer in such a way that the orifice is not located in the adhesive layer, but so that the terminating edge of the bar is flush with a drawn-on marking. For the measurement, the test article is suspended on a spring scale; specifically, the hook of the spring scale is hooked into the orifice on the wooden bar.

A slow and steady pulls is then exerted on the aluminum bar, in a direction perpendicular to the wooden panel, until sliding of the bar away from the adhesive layer is evident. The value at which the bar begins to slide is read off from the spring scale. The measured value represents the initial adhesion for an area of 15 cm$^2$. Dividing the resulting value by 15 yields the initial adhesion value in g/cm$^2$.

Method for Determining Flow Limit

The flow limit was determined using a deformation-controlled ARES rheometer (TA2000) of the TA Instruments company. The measurement was made at room temperature (25° C.) using a plate/plate system (d=15 mm; gap=1 mm). Other experimental conditions: shear rate sweep=0.01/s–10/s; flow limit identified at shear rate ≦0.8/s.

Method for Determining Tensile Shear Strength

The tensile shear strength was determined in accordance with DIN EN 205.

EXAMPLES

Examples 1 to 6

Monodose structural adhesives were produced from the components (in parts by weight) listed in Table 1, by mixing while heating to 70 to 80° C.

TABLE 1

| Example | B1 | B2 | V1 | V2 | A1 | A2 | A3 | A4 |
|---|---|---|---|---|---|---|---|---|
| 1 | 37.2 | 26.5 | 15.7 | 10.8 | 0.5 | 2.0 | 5.4 | 1.0 |
| 2 | 35.4 | 25.2 | 15.1 | 14.9 | 0.5 | 2.8 | 5.1 | 0.9 |
| 3 | 33.8 | 24.0 | 14.6 | 18.7 | 0.4 | 2.7 | 4.9 | 0.9 |
| 4 | 32.3 | 23.0 | 14.1 | 22.1 | 0.4 | 2.6 | 4.7 | 0.9 |
| 5 | 31.0 | 22.0 | 13.6 | 25.3 | 0.4 | 2.4 | 4.5 | 0.8 |
| 6* | 48.0 | 26.5 | 15.7 | 0 | 0.5 | 2.9 | 5.4 | 1.0 |

*= Comparative example with low initial adhesion and low flow limit

B1; trimethoxysilane-terminated polyether based on a polypropylene ether polyol with a molecular weight of 18,000 (Acclaim 18200 of Bayer Material Science+gamma-isocyanatopropyltrimethoxysilane of the Wacker company); B2: trimethoxysilane-terminated polyether based on a polypropylene ether polyol with a molecular weight of 2000 (Acclaim 2200N of Bayer Material Science+gamma-isocyanatopropyltrimethoxysilane of the Wacker company); V1: Aerosil 200 (pyrogenic silicic acid, BET surface 200 m$^2$/g, manufacturer: Degussa); V2: Rilanit Plus (polyamide wax, manufacturer: Cognis); A1: diaminopropyltrimethoxysilane (Geniosil GF 91 of the Wacker company); A2: vinylsilanetrimethoxysilane (Geniosil XL10, manufacturer: Wacker); A3: aminopropyltrimethoxysilane (Geniosil GF 96, manufacturer Wacker); A4: diazabicyclo[5.4.0]undec-7-ene (Nitrol DBU).

Examples 7 to 13

Monodose structural adhesives were produced from the components (in parts by weight) listed in Table 2, by mixing while heating to 70 to 80° C., Examples 7 and 8 are comparative examples in accordance with WO 01/74961.

TABLE 2

| Example | B3 | V3 | V4 | F1 | A5 | A6 |
|---|---|---|---|---|---|---|
| 7* | 64.75 | 2.0 | 1.0 | 29.9 | 1.0 | 0.05 |
| 8* | 64.75 | 2.0 | 2.0 | 29.9 | 1.0 | 0.05 |
| 9 | 64.75 | 2.0 | 4.0 | 29.9 | 1.0 | 0.05 |
| 10 | 64.75 | 2.0 | 6.0 | 29.9 | 1.0 | 0.05 |
| 11 | 64.75 | 2.0 | 8.0 | 29.9 | 1.0 | 0.05 |
| 12 | 64.75 | 2.0 | 9.0 | 29.9 | 1.0 | 0.05 |
| 13 | 64.75 | 2.0 | 10.0 | 29.9 | 1.0 | 0.05 |

*= Comparative example

B3: Ucar Latex DL 345 (50% styrene acrylate dispersion in water, manufacturer: Union Carbide); V3: silicic acid HDK T 30 (precipitated silicic acid, manufacturer: Wacker); V4: Collacral HP (polyacrylate thickener, manufacturer: BASF); F1: Omyacarb 5 GU (fatty acid-coated calcium carbonate, manufacturer: Omya); A5: Pigment emulsifier-A (ammonium polyacrylate, manufacturer: BASF); A6: JMAC LP 1% (titanium dioxide/1% AgCl, manufacturer: Johnson Matthey)

TABLE 3

| Formulation from example | Flow limit (Pa) | Initial adhesion (g/cm$^2$) | Tensile shear strength (N/mm$^2$) wood/wood |
|---|---|---|---|
| 1 | 4000 | 167 | 4.0 |
| 2 | 6000 | 240 | 3.9 |
| 3 | 8000 | 313 | 3.3 |
| 4 | 10,500 | 407 | 3.2 |
| 5 | 12,000 | 467 | 2.8 |
| 6* | 850 | 15 | 3.4 |
| 7* | 1000 | 18 | 5.9 |
| 8* | 1250 | 37 | 6.1 |
| 9 | 2200 | 57 | 5.9 |
| 10 | 2900 | 100 | 5.3 |
| 11 | 3250 | 140 | 4.6 |
| 12 | 4000 | 160 | 3.8 |
| 13 | 4350 | 180 | 2.1 |

*Comparative examples.

The invention claimed is:

1. A one-component structural adhesive that has a flow limit of at least 1500 Pa, a flow rate of <50 grams/minute, and an initial adhesion of more than 30 g/cm$^2$, and that comprises 10 to 75 wt % of an adhesive binder and 8 wt % to 50 wt % of at least one thickening agent and 0 to 50 wt % of at least one filler based on the total mass of the one-component adhesive, wherein the sum of thickening agent and filler is in the range of 20 wt % to 50 wt %, and in which the thickening agent is selected from at least one of silicic acid and an amide wax and the filler is calcium carbonate.

2. The one-component structural adhesive according to claim 1, wherein the binder is selected from polyurethane prepolymers and systems crosslinking via silyl groups.

3. The one-component structural adhesive according to claim 1, wherein the one-component adhesive is an aqueous system, a solvent-containing system, or a mixed aqueous/solvent-containing system.

4. The one-component structural adhesive according to claim 1, further comprising one or more of a curing catalyst, an adhesion promoter, a dye, a pigment, and a plasticizer.

5. The one-component structural adhesive according to claim 1, wherein it is solid in form but kneadable.

6. The one-component structural adhesive according to claim 1, comprising 20 to 50 wt % of at least one thickening agent.

7. The one-component structural adhesive according to claim 1, comprising 30 to 75 wt % of an adhesive binder.

8. A one-component, structural adhesive comprising a homogeneous mixture of 30 wt % to 75 wt % curable binder component; 8 wt % to 50 wt % thickening agent selected from at least one of silicic acid and an amide wax, and a copolymer based on acrylic acid or acrylamide; 5 wt % to 40 wt % filler and optionally a catalyst for curing the binder component; the sum of thickening agent and filler is in the range of 20 wt % to 50 wt %; wherein the adhesive is a kneadable solid, has a flow rate of <50 grams/minute, a flow limit of at least 2,000 Pa, and an initial adhesion of more than 30 grams/cm$^2$.

9. The one-component structural adhesive according to claim 8, wherein the binder component is a silyl terminated polymer according to the formula below:

$$R\text{-}[A\text{-}R^3\text{—}SiR^1_x(OR^2)_{3-x}]_n$$

in which R is an organic basic structure; A is selected from an oxygen atom, an alkylene group, a methylene group, a carboxy group, a carbamate group, a carbonate group, a ureido group, a urethane group, or a sulfonate group; $R^1$ is an alkyl residue having 1 to 4 carbon atoms; $R^2$ is an alkyl residue having 1 to 4 carbon atoms or an acyl residue having 1 to 4 carbon atoms; $R^3$ is a straightchain or branched, substituted or unsubstituted, alkylene residue having 1 to 8 carbon atoms; x is 0 to 2; n is 1 to 10,000; wherein the silyl residues are identical or different, and in the case of multiple $R^1$ and/or $R^2$ residues, the latter are respectively identical or different.

10. The one-component structural adhesive according to claim 8, wherein the binder component is a polyurethane prepolymer.

11. The one-component structural adhesive according to claim 8, wherein the binder component cures upon exposure to atmospheric humidity.

12. The one-component structural adhesive according claim 8, having an initial adhesion of more than 100 grams/cm$^2$.

13. A structure comprising two spaced substrates and the one-component structural adhesive of claim 8 forming a bond between the substrates, bond provided by the uncured structural adhesive has an initial adhesion of more than 30 grams/cm$^2$ and the bond provided by the cured structural adhesive has strength of more than 2 N/mm$^2$.

14. The structure of claim 13 wherein each substrate is independently selected from tile, wood, metal, plastic, ceramic, glass and painted surface.

15. A method for manufacturing a one-component structural adhesive according to claim 1, wherein the method comprises mixing the constituents of the one-component structural adhesive with one another optionally in dissolved, predispersed, pre-emulsified or melted form, and optionally at elevated temperature.

* * * * *